United States Patent [19]

Page

[11] Patent Number: 4,877,959
[45] Date of Patent: Oct. 31, 1989

[54] SPACE PHOTON SOURCE LOCATOR

[75] Inventor: George H. Page, La Mirada, Calif.

[73] Assignee: Rockwell International Corporation, El Segundo, Calif.

[21] Appl. No.: 98,642

[22] Filed: Sep. 21, 1987

[51] Int. Cl.⁴ .............................................. G01J 1/20
[52] U.S. Cl. ............................ 250/336.1; 250/203 R; 250/505.1
[58] Field of Search .............. 250/203 R, 252.1, 332, 250/342, 336.1, 505.1; 33/270, 351

[56] References Cited

U.S. PATENT DOCUMENTS

| | | | |
|---|---|---|---|
| 4,227,077 | 10/1980 | Hopson et al. | 250/342 |
| 4,287,412 | 9/1981 | Couderc et al. | 250/203 R |
| 4,574,191 | 3/1986 | Conrad | 250/203 R |
| 4,593,187 | 6/1986 | Grotts et al. | 250/203 R |
| 4,769,531 | 9/1988 | Malek | 250/203 R |

Primary Examiner—Janice A. Howell
Attorney, Agent, or Firm—H. Fredrick Hamann; George A. Montanye; Tom Streeter

[57] ABSTRACT

An apparatus and method for measuring the orientation of an observer vehicle with respect to a radiative target. The apparatus comprises a gnomon, a radiation sensor assembly and conventional electronic hardware for measuring the output of the radiation sensor assembly. The radiation sensor assembly is divided into four quadrants each having an equal number of sensor element which emit a current in the presence of radiation. The individual currents from each respective sector are summed by said conventional electronic hardware to provide the orientation/angular relationship between the radiative target and the apparatus.

16 Claims, 3 Drawing Sheets

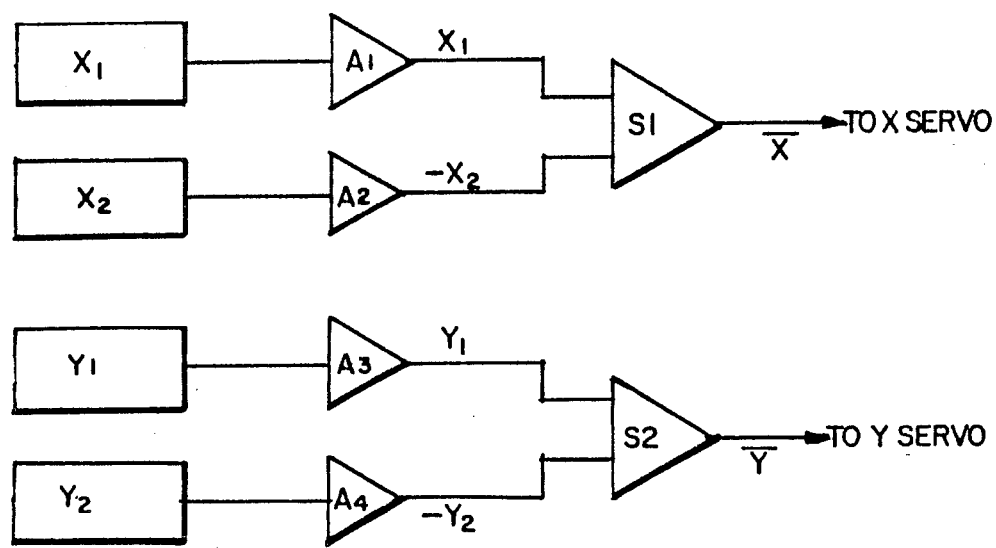
FIG. 3
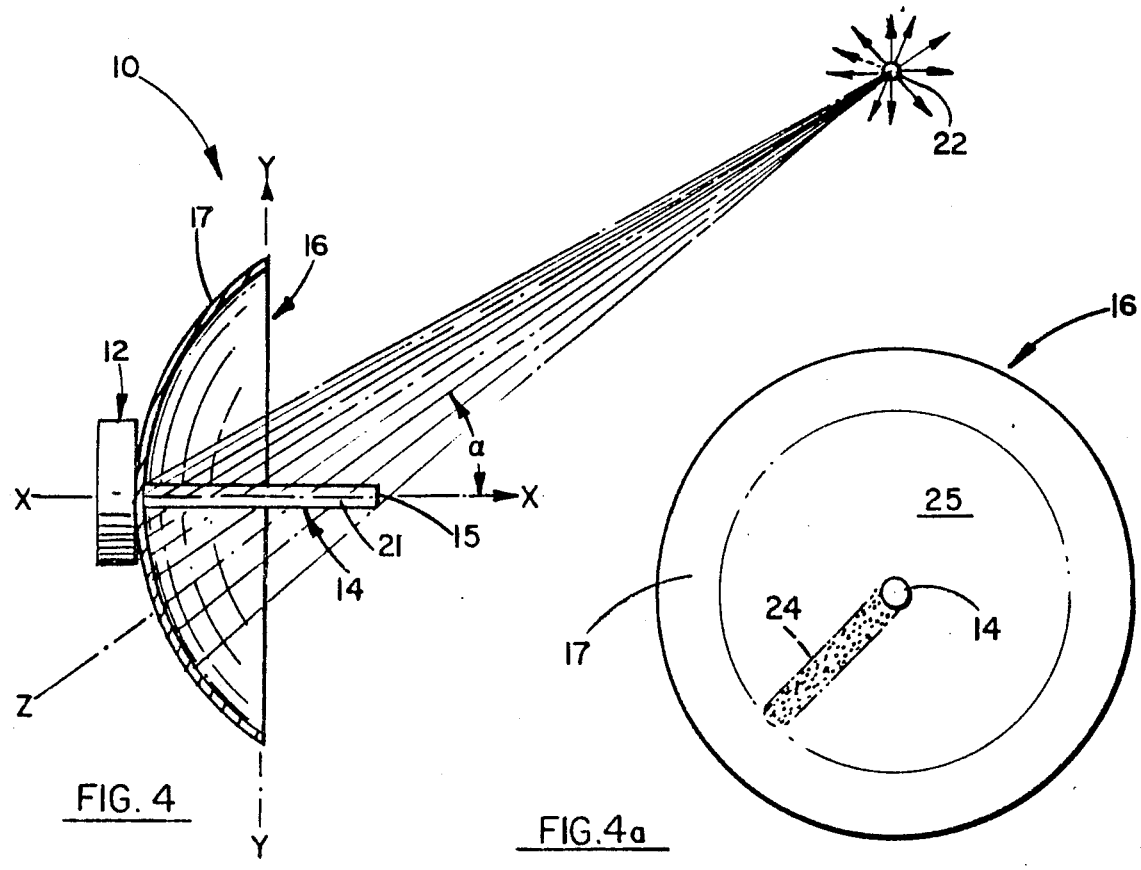
FIG. 4
FIG. 4a

SPACE PHOTON SOURCE LOCATOR

BACKGROUND OF THE INVENTION

1. Field of the Invention

The instant invention relates to space photon locators. More specifically, the invention relates to a method and apparatus for measuring the orientation of an observer vehicle with respect to a radiative target.

2. Description of the Prior Art

In the field of target detection/tracking there are several known techniques. The known systems rely on guidance techniques which range from program guidance, to in-flight target search, detection, and selection. Specific examples of such systems include sonar, radar, magnetic and infra-red detectors. These systems and devices attempt to accurately locate an object within a given space. Unfortunately, these systems are complicated and extremely expensive to implement.

Sonar and radar only detect the location of a target. In the case of a large number of targets in a small area of space, these systems do not distinguish between radiator and non-radiators. Infra-red detectors will detect targets which radiate in the infra-red range of the spectrum (which is photon energy but in a specific energy range). The invention described herein will, if designed around an infra-red array, not only locate the radiator within a given space but will also determine the spacial relation between the radiator and the observer. It is to be appreciated that the teachings of the invention described herein may be extended to detect myriad forms of radiation without departing from the scope and spirit of the invention.

A preferred embodiment of the invention described herein, utilizes material which will absorb high energy photons, in order to determine the spacial relationship between the observer and a high energy (x-ray or gamma-ray) photon radiator. Heretofore, prior art sensors for this particular application have required large amounts of heavy shielding materials which make them impractical for space-located applications.

SUMMARY OF THE INVENTION

The invention is defined by the appended claims with a specific embodiment illustrated in the attached drawings. For purposes of summarizing the invention, the invention comprises a high energy photon radiation sensor and an absorber (gnomon) arranged in the general form of a sun dial.

In a preferred embodiment, radiation shines on a phalanx of radiation sensors which have been arranged in the shape of a disc divided into four equal sized quadrants. An absorber (gnomon) is positioned concentrically with respect to said quadrants. If a radiative source is located at an angle to the position of the sensor disc, the center post, or gnomon, casts a shadow on one or two of the disc sensor quadrants. The shadow is actually an area on the sensor disc which is shielded from radiation.

The radiation sensors, or PIN diodes, in the preferred embodiment provide a current when exposed to gamma radiation. The differential output currents generated in the individual sensor quadrant segments is a measure of the shadowing effect and therefore of the angular relationship between the radiative target vehicle and the sensor, or observer vehicle.

The present invention contemplates a method and apparatus for determining angular orientation between an observer vehicle and a radiative target that requires a minimum amount of hardware and which is usable at varying distances from the radiative target. The individual output currents generated by the sensors are analyzed trigonometricly to determine the precise angular orientation between the observer vehicle with respect to the radiative target.

It is the object of this invention to provide an apparatus and method which overcomes the aforementioned inadequacies of the prior art devices and methods while also providing an improvement which is a significant contribution to the advancement of navigation and target finding.

It is another object of the invention to provide an orientation device that uses trigonometric techniques to solve a radiation emitting target's position in terms of its Cartesian or angular coordinates.

It is yet another object of this invention to provide a method for determining the angular relationship between a radiative target vehicle and the device wherein the radiative target is at a great distance from the observer vehicle.

It is a further object of the invention to provide a device capable of processing directional information and supplying navigational intelligence to a servo control system.

It is yet another object of this invention to provide a sensor system which does not require large amounts of heavy shielding materials.

Still another object of this invention is to provide a system which is capable of seeking out and tracking radiation emitting sources.

The foregoing summary of the invention outlines some of the more pertinent objects and features of the invention. The objects should be construed to be merely illustrative of some of the more prominent features and applications of the intended invention. Many other benefits or results can be obtained by applying the disclosed invention in a different manner or by modifying the invention within the scope of the disclosure. The summary outlines rather broadly the more pertinent and important features of the present invention in order that the Detailed Description of the Invention that follows may be better understood so that the present contribution to the art can be more fully appreciated.

Additional features of the invention will be described hereinafter which form the subject of the claims of the invention. It should be appreciated by those skilled in the art that the conception of the specific embodiments disclosed may be readily utilized as a basis for modifying or designing other structures and methods for carrying out the same or similar purposes of the present invention. It should also be realized by those skilled in the art that such equivalent constructions do not depart from the spirit and scope of the invention as set forth in the appended claims.

BRIEF DESCRIPTION OF THE DRAWINGS

Further objects and advantages of the present invention will become apparent as the following Description of the Preferred Embodiment proceeds, taken in conjunction with the accompanying drawings in which:

FIG. 3 is a block diagram representing the processing electronics which generate the vector representations presented to typical servo controllers.

FIG. 4 is a cross-sectional view illustrating the space photon locator device positioned in an angular displacement with respect to a high energy photon radiative source.

FIG. 4a is a front view of the space photon locator illustrating the shadowing effect created by the positioning of the space photon source locator with respect to a radiative target.

Similar reference characters refer to similar parts throughout several views of the drawings. Drawing Reference Numerals:

Figure 1:
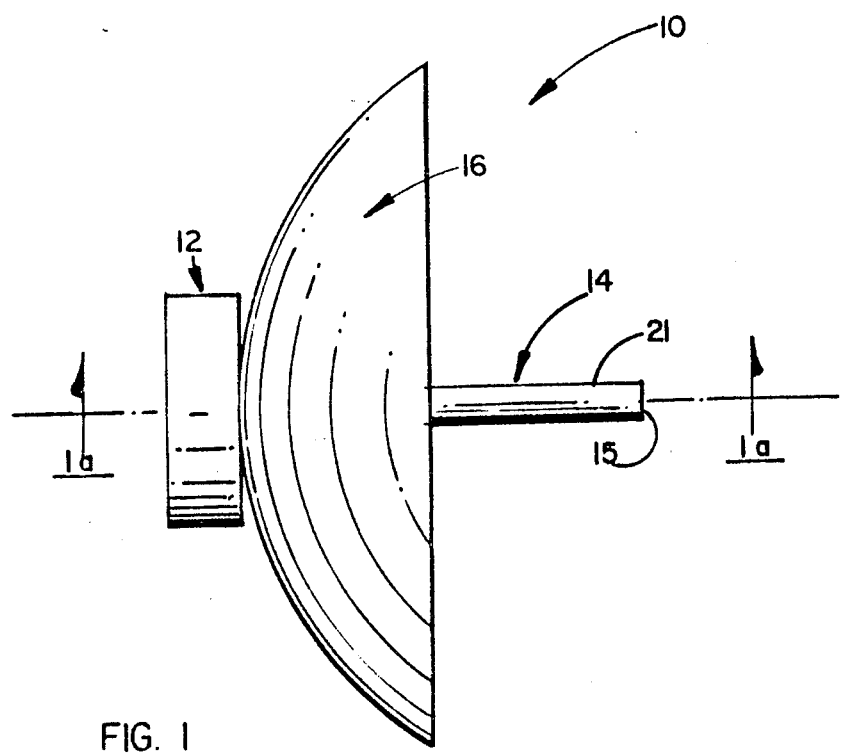
FIG. 1 is a side elevational view of the space photon locator device.

10. Space photon locator
12. Electronics package
14. Absorber or gnomon
15. Distal end of 14
16. Radiation sensor assembly
17. Outer edge of 16
18. Axial tunnel of 14
19. Proximate end of 14
20. Sensor elements of 16
21. Edge of 14
22. High energy photon radiative source
24. Shadowed area of 20
25. Non Shadowed area of 20

DETAILED DESCRIPTION OF THE PREFERRED EMBODIMENT

Figure 1A:
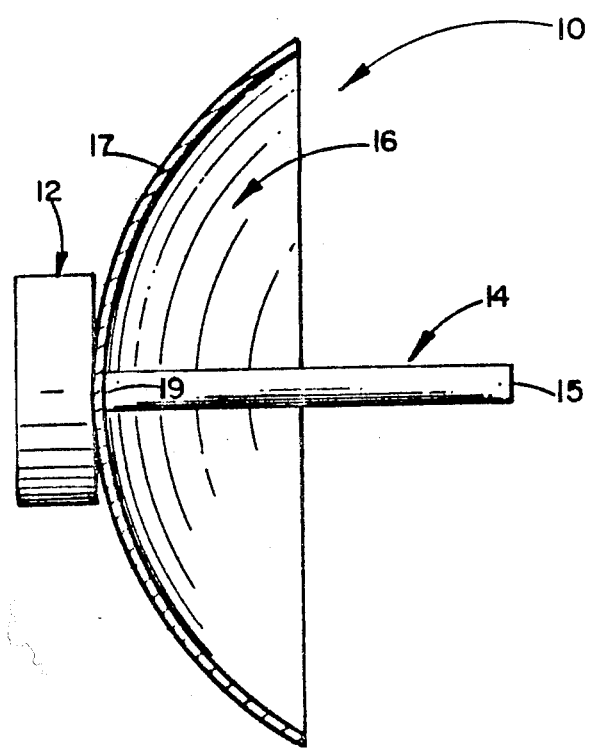
FIG. 1a is a cross sectional view of the space photon locator taken along line 1a of FIG. 1.
Figure 2:
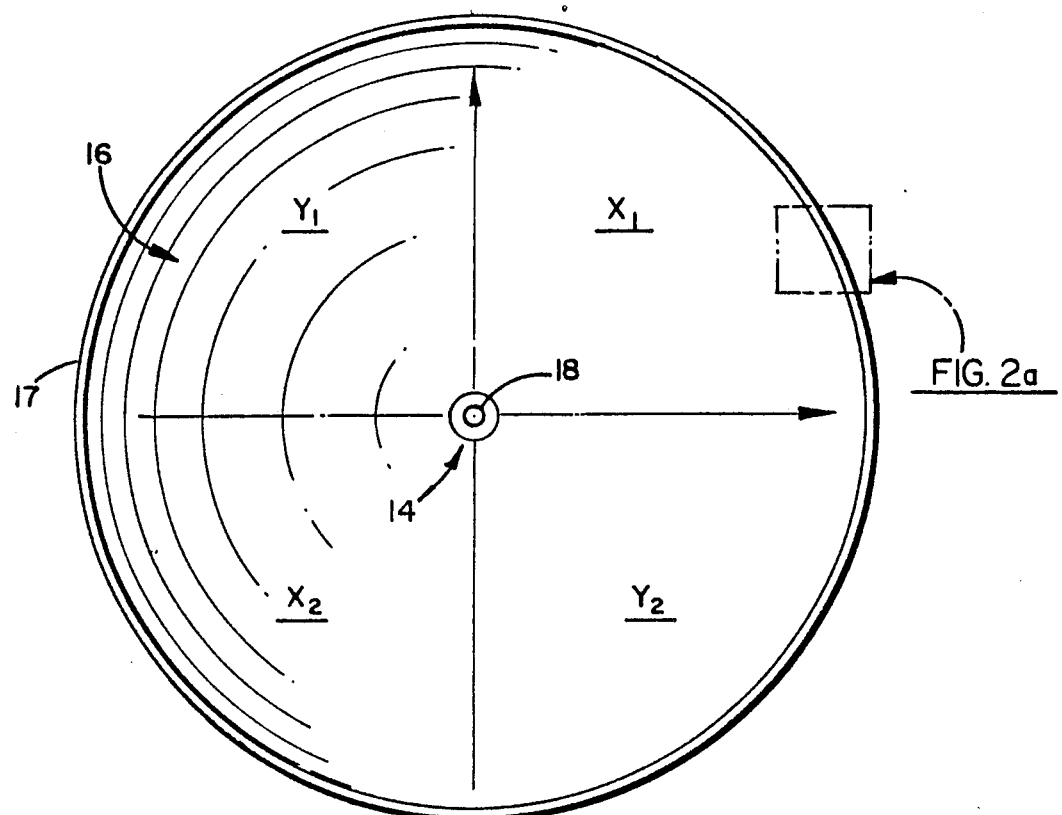
FIG. 2 is a front view of the space photon locator device.

Referring now to the drawings, and particularly to FIGS. 1, 1a, and 2 thereof, there is shown a side elevational view, a cross sectional view and a front view of a preferred embodiment of the space photon locator device 10. The space photon locator 10 comprises an electronics package 12, an absorber or gnomon 14, and a radiation sensor assembly 16.

More specifically, the radiation sensor assembly 16 is preferably circular/dish shaped and is divided into four quadrants, labeled X1, X2, Y1, and Y2 respectively. An absorber, or gnomon, 14 having a distal end 15 and a proximate end 19 (19 shown in FIG. 1a), is shown concentrically positioned with respect to the outer edge 17 of the radiation sensor assembly 16. As will be best appreciated from referring to FIG. 1a, the distal end 15 of the gnomon 14 protrudes outwardly from the radiation sensor assembly 16 and the proximate end 19 is affixed to said sensor assembly 16. The gnomon 14 of the preferred embodiment is typically constructed out of material having measurable shielding properties with respect to photon radiation. For example, materials having a high Z (atomic weight) such as lead, tantalum or tungsten are contemplated for use in conjunction with the particular embodiment described of the instant invention.

Figure 2A:
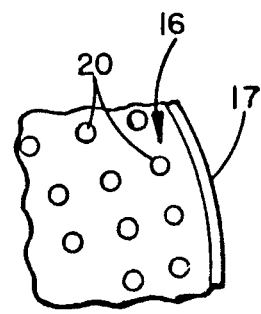
FIG. 2a is an exploded fragmentary view of a small segment of the sensor assembly illustrated in FIG. 2 representing the relative locations of individual sensor elements.

FIG. 2a, illustrates an exploded fragmentary view of a small segment of the sensor assembly 16 of FIG. 2. As can be seen from FIG. 2a, each sector of the radiation sensor assembly 16 is comprised of an equal number of individual sensor elements 20 which are preferably Positive-intrinsic-Negative (PIN) silicon diodes designed to emit current in the presence of high energy photon radiation.

The structure and operation of the device 10 as illustrated in FIGS. 1 and 2 can be conceptually analyzed by referring to FIG. 4 which illustrates the space photon locator 10 positioned in an angular displacement with respect to high energy photon radiative source 22. Essentially, the space photon locator 10 operates on a 3 axis system, namely the X, Y and Z axis as illustrated. During the implementation of the space photon locator 10, it may be placed on a vehicle in a manner such that the Z axis defines a vector pointing in a direction which will define a straight line from the space photon locator 10 to an object 22 radiating high energy photons (e.g., x-rays or gamma-rays). The X and Y axes are fixed to the space photon locator 10 and describe a plane orthogonal to the Z axis.

As best shown in FIGS. 2 and 2a, and as mentioned above, the X-Y plane is organized into four sectors ($X_1$, $X_2$, $Y_1$, $Y_2$), or sets, of sensors 20 which comprise the radiation sensor assembly 16. Currents generated in each sector are a measure of the radiation intensity impinging on the individual sensors 20 comprising the radiation sensor assembly 16. The current generated in each of the respective sectors of the radiation sensor assembly 16 is summed to represent two vectors:

$$X = X_1 + X_2$$

$$Y = Y_1 + Y_2$$

Where $X_1$, $X_2$, $Y_1$, and $Y_2$ are variables representing a measure of the currents generated in each of the respective sensor sectors. The current generated in $X_1$ sector is positive and the current generated in the $X_2$ sector is processed to be of an opposite polarity to that of $X_1$. Similarly, the current generated in $Y_1$ sector is positive and the current generated in $Y_2$ sector is processed to be of opposite polarity to that of $Y_1$. This algebraic relationship is implemented via conventional electronic hardware 12 (See FIG. 1) comprising operational amplifiers and summing amplifiers shown schematically in FIG. 4.

As illustrated in FIG. 3, the sum total output X and Y from the respective summing amplifiers S1 and S2 respectively are fed into an X servo and a Y servo. The X servo will cause the vehicle to turn about the Y axis and the Y servo will cause the vehicle to turn about the X axis in a manner to drive the $\overline{X}$ and $\overline{Y}$ signals to a null, as represented by the following two equations:

$$X_1 + X_2 = 0$$

$$Y_1 + Y_2 = 0$$

When both vectors are nulled the Z-axis of the invention 10 will be pointed directly at the radiating object.

More particularly, referring again to FIG. 4, photon radiation from radiative source 22 'shines' on the radiation sensor assembly 16. If the radiative source 22 is positioned at an angle $\alpha$ with respect to the radiation sensor assembly 16, the absorber or gnomon 14 functions to effectively cast a shadow on several of the radiation sensor assembly 16 sensor elements 20 (20 shown in FIG. 2a). This shadowing effect, as illustrated in FIG. 4a, is actually an area 24 on the sensor assembly 16 that is shielded from high energy photon radiation. The photon energy functions to create output currents in the sensor elements 20 which are a measure of the absorber or gnomon 14's shadowing effect therein and is therefore indicative of the angular relationship of the radiative source 22 with respect to the space photon locator 10.

When the absorber or gnomon 14 is aligned directly along the Z axis toward a radiating source 22 a minimum attenuation of the photon energy which impinges on the radiation sensor assembly 16 must be developed. When a misalignment between the distal end 15 of the gnomon 14 and the radiating source 22 occurs, the attenuation (or shadowing 24) must be sufficient to provide a detectable difference in the induced currents between the shadowed and non-shadowed sectors 25 of the radiation sensor assembly 16.

More specifically, the gnomon 14 should effectively shield any sensor elements 20 directly in alignment with the gnomon 14 and the radiating source 22. As illustrated in FIG. 4 and 4a, the radiation sensor assembly 16 is oriented at an angle $\alpha$ with respect to the line of sight vector Z and the high energy photon radiative source 22. In this position a shadow 24 is cast on sensors 20 (sensors 20 illustrated in FIG. 2a) and some of the sensors 20 will inherently receive less photon radiation than the others. The desired photon radiation shielding is accomplished by utilizing an absorber or gnomon 14 of an appropriate length, diameter and appropriate shielding material. The diameter, length and composition of the gnomon 14 selected, are preferably sufficient to provide a measurable shielding or shadowing effect of high energy photon radiation from the sensors 20 embodied as part of the radiation sensor assembly 16.

The calculation of the length and diameter of gnomon 14 is dependent upon the selection of the material for the gnomon's 14 construction. The materials previously mentioned, namely lead, tantalum and tungsten typically exhibit a minimum absorption coefficient of approximately 0.04 at a photon energy level of approximately 1 MEV and are preferred gnomon 14 construction materials. It is to be noted that a myriad of materials having a high Z atomic weight could be substituted for the specific examples given herein without departing from the spirit and scope of the instant invention.

The relationship between impinging radiation and absorbed energy in the gnomon 14 is represented by the following equation:

$$I = I_o e^{-ax}$$

where
$I$ = the projected energy at a given point in the material of the Gnomon 14.
$I_o$ = the impinging energy at the outer exposed surface of the gnomon 14.
$e$ = the natural logarithm base.
$a$ = The coefficient of absorption of the gnomon 14 material.
$x$ = the depth or thickness, in centimeters, of the gnomon 14 material under evaluation.

The ratio of "shine-through", or energy exiting the material of the gnomon 14 to that energy impinging on the exposed surface of the gnomon 14, is represented by the following equation:

$$I/I_o = e^{-ax}$$

Assuming an attenuation factor of 10 and an absorption coefficient of 0.04, which relates to the gnomon 14 material as suggested above and a photon energy of 1 Mev or greater, gnomon 14 length of 57.56 cm would be desirable and said length would be calculated as follows:

$$I/IO = e^{-ax} = e^{-.04x}$$

$$L_n .10 = -.04x$$

$$-2.30259 = -.04x$$

$$x = 57.56 \text{ cm long}$$

As a further example, assume an environment exists where the photon energy level contemplated is now 100 Kev rather than 1 Mev and that the gnomon 14 is constructed from tantalum. (The absorption coefficient of tantalum at 100 Kev is approximately 4 rather than 0.04.) Also assume a gnomon 14 length of 7 inches, or approximately 17 centimeters, and a gnomon 14 diameter of 2 centimeters. Because there is no clear cut bound on the dimensions of the gnomon 14, the dimensions cannot be strictly bounded beyond the need to obtain a significant shadowing effect. At a length of 17 centimeters, the gnomon 14 will provide a maximum attenuation as indicated by the following calculations:

$$I/IO = e^{-4x} = e^{4(17)}$$

$$Ln (I/IO) = -4(17) = -68$$

$$I/IO = \approx 2.9 \times 10^{-30}$$

As the angle $\alpha$ between the center-line of the gnomon and the radiating source 22 approaches zero degrees, the shadowing effect of the gnomon 14 on the sensors 20 becomes less. As the angle $\alpha$ increases from zero, the thickness of shadowing material exposed to the pnoton radiation is reduced toward that looking through the diameter of the gnomon 14. The exposed area varies from zero at the edge 21 of the gnomon 14 to approximately 2 centimeters at the full diameter of the gnomon 14. The attenuation of the gnomon 14 at its full diameter (a worst-case minimum attenuation condition), is represented by:

$$I/IO = e^{-4x} = e^{-4(2)}$$

$$Ln (I/IO) = -4(2) = -8$$

$$I/IO = 3.35 \times 10^{-4}$$

At an angle $\alpha$ of 90 degrees.

It is apparent that the attenuation will vary across the diameter of the gnomon 14 perpendicular to the direction of the impinging radiation. Therefore, assuming the effective diameter of the gnomon 14 is an average of half the maximum value, the shine-through will still be of a negligible value.

This is illustrated below by using an effective diameter of 1.0 centimeters rather than the full 2.0 centimeters:

$$\begin{aligned} I/IO &= e^{-4 \times 1} \\ &= e^{-4} \\ &= 1.83 \times 10^2 \\ &= 0.0183 \end{aligned}$$

As can be appreciated, the 0.0183 value is still negligible.

Referring again to FIGS. 2 and 2a, the silicon diodes 20 are electrically connected in parallel to maximize the output current from each of sectors Y1, X1, X2 and Y2 of the radiation sensor assembly 16. For purposes of an example, assume that each sensor sector X1, X2, Y1, and Y2 respectively is approximately 3 inches square and that each sensor element 20 is approximately 0.1 inch square. This arrangement would yield four sectors, each respectively having approximately 1000 Pin diodes. Existing sensors, used as radiation detectors, typically produce 500–1000 pico amps per rad-per-second of photon energy deposited in the PIN diodes. If we assume that a dose rate of 1 rad-per-second will generate 500 pico amps or 0.5 nanoamps then each sector will produce $$1000 \times 0.5 = 500 \text{ nanoamps/rad/SEC or } 0.5 \text{ microamps/rad/Sec.}$$

Referring again to FIGS. 4 and 4a, it can be appreciated that the limiting factor for obtaining a variation in shadowing effect vs. angle $\alpha$ between gnomon 14 line-of-sight to the radiating source 22 is when the length of the shadowed area 24 reaches the outer diameter of the sensor assembly 16. For the dimensions chosen in the example above this occurs at an $\alpha$ of approximately =23 degrees. At an $\alpha=23$ degrees a shadow 24 of approximately 2 centimeters wide and approximately 7.5 centimeters long will be created on the sensor assembly 16 assuming the sensor assembly. FIG. 4a is a front view of the space photon locator 10 taken along the 4a of FIG. 4 illustrates the aforementioned shadowing effect. Under the example conditions given above the shadow generated would be approximately the radius of the sensor array described above and represents the saturation value of the vector magnitudes defined by the photo current variations.

The shadow cast by the gnomon 14 would cover a total of approximately two-hundred and forty (240) sensors 20, thereby reducing the photo currents generated in one quadrant (assuming, for purposes of explanation that the orientation is such that the entire shadowing effect resides in only one quadrant) by 24%. Thus, the vector ($\overline{X}$ or $\overline{Y}$) generated by the shadowing effect would be approximately 0.875 of its fully exposed value. It is to be noted that the dimensions of the sensor assembly 16, gnomon 14 as shown and described herein are not necessarily optimized for maximum effectiveness but, rather were chosen for exemplary purposes only. A shorter and wider gnomon 14 would modify the performance of the space photon locator 10. For instance, a larger diameter sensor assembly 16 would increase the sensitivity of the space photon locator 10 and a smaller diameter sector assembly would accordingly decrease the sensitivity.

An embelishment of the basic gnomon 14 design is best shown in FIG. 2 wherein a very small diameter axial tunnel 18 is positioned axially through the center of the gnomon 14. A single sensor (PIN diode not shown) is positioned in the precise center of the radiation sensor assembly 16 aligned with the axial tunnel 18 in the gnomon 14. When the radiation sensor assembly 16 is aligned in a position such that the axial tunnel 18 in the gnomon 14 is directly aligned to the radiating source 22 (again, see FIG. 4), photons will shine through the axial tunnel 18 and strike the single sensor. In this manner a very precise alignment of the gnomon 14 with the radiating source 22 may be achieved. Hence, it should be appreciated that the particular embodiment described herein can be modified to fit a myriad of specific applications.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention. Now that the invention has been described,

What is claimed is:

1. An apparatus, comprising:
   means for detecting radiation emanating from a source of radiation;
   means positioned with respect to said means for detecting for blocking at least a portion of said means for detecting when said means for detecting is not oriented in the direction of a source of radiation; and
   means coupled to said means for detecting and responsive to blocked radiation for orienting said means for detecting in the direction of a source of radiation.

2. The apparatus of claim 1, wherein said means for detecting comprises a plurality of individual sensors.

3. The apparatus of claim 2, wherein said plurality of individual sensors are disposed in a circular configuration.

4. The apparatus of claim 1, wherein aid means for detecting comprises a plurality of sensors interconnected to form four individual quadrants and wherein said means for orienting comprises means responsive to radiation blocked in any of said four quadrants for orienting said means for detecting to decrease said blocked radiation.

5. An apparatus comprising:
   means for detecting radiation emanating from a source of radiation, said means for detecting comprising a plurality of individual sensors disposed in a circular configuration;
   means positioned with respect to said means for detecting for blocking at least a portion of said means for detecting when said means for detecting is not oriented in the direction of a source of radiation, said means for blocking comprising a cylindrical tube extending centrally from said circular configuration of sensors; and
   means coupled to said means for detecting and responsive to blocked radiation for orienting said means for detecting in the direction of a source of radiation.

6. An apparatus comprising:
   means for detecting radiation emanating from a source of radiation, said means for detecting comprising a plurality of individual sensors disposed in a circular configuration and a sensor positioned to detect radiation received through the below recited cylindrical tube when said means for detecting is positioned in the direction of a source of radiation;
   means positioned with respect to said means for detecting for blocking at least a portion of said means for detecting when said means for detecting is not oriented in the direction of a source of radiation, said means for blocking comprising a cylindrical tube extending centrally from said circular configuration of sensors; and means coupled to said means for detecting and responsive to blocked radiation for orienting said means for detecting in the direction of a source of radiation.

7. An apparatus, comprising in combination:

a radiation sensor assembly for sensing radiation emitted from a source of radiation;

a gnomon positioned with respect to said radiation sensor assembly to block radiation illuminating said sensor assembly when said assembly is not positioned in the direction of a source of radiation; and means for measuring radiation sensed by said sensor assembly to determine when radiation is being blocked by said gnomon.

8. The apparatus of claim 7, wherein said radiation sensor assembly further comprises individual sensor elements which emit current in the presence of high energy photon radiation.

9. The apparatus of claim 8, wherein said individual sensor elements are positive intrinsic negative (PIN) silicon diodes.

10. The apparatus of claim 8, wherein said individual sensor elements are connected electrically and are arranged into four equal quadrants, said quadrants each respectively having an equal number of said sensors therein.

11. The apparatus of claim 10 wherein said means for measuring includes means for receiving outputs from each of said quadrants and summing the outputs as follows:

$$X_1 + X_2 = X$$

$$Y_1 + Y_2 = Y$$

wherein $X_1$, $X_2$ represent the outputs of one pair of opposed quadrants and $Y_1$, and $Y_2$ represent the outputs of another pair of opposed quadrants of said radiation sensor assembly.

12. The apparatus of claim 11, further including means responsive to said summed outputs for moving said sensor assembly in a direction to cause each of said summed outputs to go to zero.

13. The apparatus of claim 7, wherein said gnomon is a cylindrical rod constructed from a material comprising an element having a high Z atomic weight.

14. The apparatus of claim 13, wherein the element is selected from a group consisting of lead, tantalum and tungsten.

15. The apparatus of claim 7, wherein said gnomon includes an axial hole, and is constructed from a material comprising an element having a high Z atomic weight.

16. The apparatus of claim 15, wherein the element is selected from a group consisting of lead, tantalum and tungsten.

* * * * *